United States Patent [19]

Thornton

[11] Patent Number: 4,620,261

[45] Date of Patent: Oct. 28, 1986

[54] APPARATUS AND METHOD FOR CONTROLLING ELECTROMAGNETIC CLUTCHES AND THE LIKE

[75] Inventor: James P. Thornton, Dunmore, Pa.

[73] Assignee: Fairchild Weston Systems, Inc., Archbald, Pa.

[21] Appl. No.: 659,737

[22] Filed: Oct. 11, 1984

[51] Int. Cl.$^4$ .................. F16D 27/16; H01H 47/32
[52] U.S. Cl. ..................... 361/154; 192/84 C
[58] Field of Search ............... 361/154, 152; 192/3.56, 192/21.5, 53 D, 84 R, 84 C

[56] References Cited

U.S. PATENT DOCUMENTS

| | | | |
|---|---|---|---|
| 3,581,156 | 5/1971 | Dolbachian | 361/154 |
| 3,786,314 | 1/1974 | Misch | 361/154 |
| 3,857,081 | 12/1974 | Gebelein, Jr. | 361/160 |
| 4,180,026 | 12/1979 | Schulzke et al. | 361/154 |
| 4,266,261 | 5/1981 | Streit et al. | 361/194 |
| 4,351,299 | 9/1982 | Costello | 361/152 |
| 4,399,483 | 8/1983 | Phelan | 361/154 |
| 4,417,201 | 11/1983 | Reddy | 361/154 |
| 4,480,732 | 11/1984 | Takano | 192/0.052 |
| 4,509,091 | 4/1985 | Booth | 361/154 |

*Primary Examiner*—Michael L. Gellner
*Attorney, Agent, or Firm*—Stephen A. Becker; Dale Gaudier

[57] ABSTRACT

To energize an electromagnetic clutch or other electromagnetic device having a movable armature, a voltage is applied across the coil of the device to cause an initial current to flow therethrough. A current dip upon initial movement of the armature is detected, and in response, a substantially linearly increasing current is applied to the coil, establishing a controlled movement of the armature.

14 Claims, 6 Drawing Figures

APPARATUS AND METHOD FOR CONTROLLING ELECTROMAGNETIC CLUTCHES AND THE LIKE

TECHNICAL FIELD

The invention relates generally to electromagnetic device drive circuitry, and more particularly, toward a method of and system for controlled excitation of the coil of an electromagnetic clutch or other electromagnetic device.

BACKGROUND ART

Solenoid driven clutches of the type commonly used with appliances and automotive accessories must establish smooth torque transfer between motor and load to minimize noise and wear. When a clutch coil is energized by a fixed magnitude voltage source, the rate of rise of coil current is a function of the R-L time constant of the coil and driving circuitry; saturation current is limited by coil resistance.

Following initial energization of the coil, electromagnetic flux developed by the coil causes the armature of the clutch to move in a direction to reduce the solenoid air gap within a magnetic circuit constituting the coil, armature and gap. During initial movement of the armature, there is a dip or "decrease" in coil current; thereafter, current continues to rise at a slightly lower rate determined by the increased value of inductance of the coil caused by the smaller air gap. Because the force applied to the armature by the magnetic field produced by the coil is non-linear and substantially uncontrolled, torque transfer between the plates of the clutch tends to be abrupt and noisy, and there is excessive wear of the plate surfaces.

DISCLOSURE OF INVENTION

It is accordingly one object of the invention to provide a method of and circuit for providing controlled movement of the armature of an electromagnetic device.

Another object is to provide a method of and circuit for controlling energization of the coil of an electromagnetic device to establish controlled armature movement.

A further object is to provide a method of and circuit for energizing the coil of an electromagnetic clutch to establish a smooth armature transition in the region of clutch engagement, preventing jerkiness and chatter while minimizing wear of the clutch faces.

An additional object is to provide a method of and circuit for initially energizing the coil of an electromagnetic clutch with a predetermined voltage, and following initial armature movement, supplying a current to the coil having a substantially linear ramp-up characteristic to establich smooth armature movement through the region of the clutch engagement.

A further object is to provide an electromagnetic clutch controller that applies an initial voltage across the clutch coil, detects initial armature movement and in response reduces coil current to a preset "fallback" value and then drives the coil with a current having a substantially linear ramp-up characteristic.

The above and other objects are satisfied, in accordance with the invention, by a control circuit that applies an initial voltage across the coil of an electromagnetic clutch or other electromagnetic device to cause an initial current to flow therethrough. Circuitry within the controller measures the coil current to detect an initial current dip indicative of initial armature movement. In response, the controller causes current to decrease to a preset "fallback" level after which the controller applies to the coil a further current having a magnitude that increases substantially linearly, to establish controlled further movement of the armature.

The initial current dip is detected by a differentiator circuit which triggers the drop in coil current to the "fallback" level whereupon the controller, responding to a ramp generator, drives coil current linearly upward to saturation. This imparts to the armature smooth and controlled movement through the region of clutch engagement.

As a further aspect of the invention, a reset network detects initial application of power to the controller at start-up, and in response, maintains the coil deenergized for a predetermined time period, to prevent "false-start" of the clutch.

Still other objects and advantages of the present invention will become apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrated in nature, and not as restrictive.

BEST MODE FOR PRACTICING THE INVENTION

Figure 1:
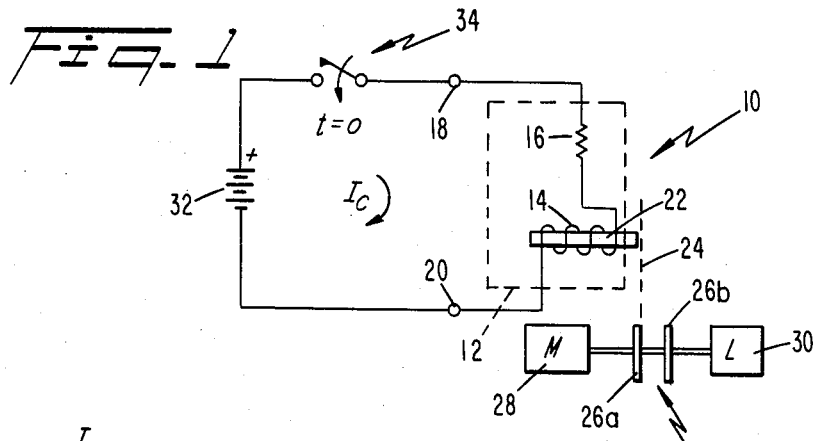
FIG. 1 is a circuit diagram showing energization of an electromagnetic clutch coil from a constant voltage source.

With reference to FIG. 1, a conventional solenoid type electromagnetic clutch 10, shown schematically, comprises an electromagnetic coil 12 equivalent parametrically to an inductance 14 and coil resistance 16 in series with a pair of input terminals 18, 20. The coil 12 is part of a magnetic circuit that includes a movable armature 22 forming a core of the coil, and an air gap (not shown). The armature 22 is coupled at 24 to one clutch plate 26a of a clutch mechanism 26. When energized, the coil 12 develops an electromagnetic field which drives the armature 22 in a direction to close the air gap. The clutch plate 26a, connected to motor 28, is thereby indexed by coupler 24 to engage with the second clutch plate 26b of the clutch mechanism 26, to drive a load 30. The mechanics of coupling means 24, being conventional, is not described in detail herein for brevity.

Coil 12 is energized via switch 34 by a fixed source 32 of voltage, shown schematically in FIG. 1 as a battery. As is well known, upon closure of the switch 34, current $I_c$ flow through the coil 12 increases as a function of the R-L time constant of the coil; the saturation current of the coil is limited by coil resistance 16. The rate of increase of coil current $I_c$ is not monotonic, however, because as the armature 22 closes, the self-inductance of the coil abruptly increases, causing a dip in coil current.

Figure 2:
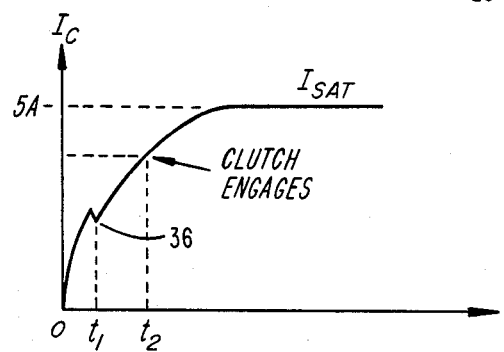
FIG. 2 is a graph showing flow of current through the coil as a function of time following switch closure.

Thus, referring to FIG. 2, upon closure of switch 34, the inductance of the coil is initially at a minimum with the armature 22 in its rest position, i.e., with the gap of the solenoid fully open. Coil current I rises initially at a rate determined by the time constant of coil 12, as shown in region 35 of the graph. At a time $t_1$ after switch closure, however, the armature 22 in response to force induced on it by magnetic flux, indexes to close the air gap. The inductance of coil 12 now increases as the gap decreases, and this creates a dip in coil current $I_c$ (see point 36 on the graph in FIG. 2) followed by a rise in coil current at a new rate determined by the new, higher value of inductance. Torque transfer between clutch plates 26a and 26b that begins at time $t_2$ tends to be abrupt and creates a substantial amount of noise. Coil current $I_c$ peaks and remains constant at the saturation value $I_{sat}$ of the coil 12.

Figure 3:
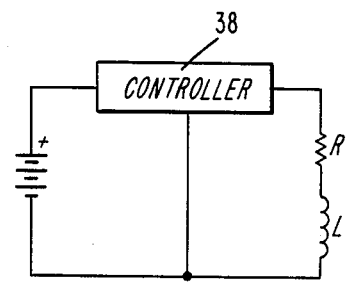
FIG. 3 is a simplified diagram showing a controller for energizing the clutch coil in accordance with the principles of the invention.
Figure 5:
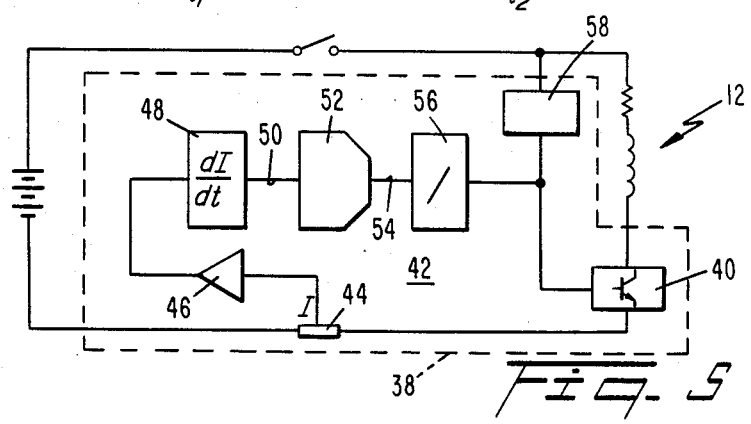
FIG. 5 is a simplified block diagram showing the contents of the controller.

In accordance with the invention, a clutch controller 38 shown in FIG. 3, monitors coil current $I_c$, detects the initial current dip 36 at time $t_1$ indicative of armature movement and, in response, causes a drop to the "fallback" level and controls the ramp-up of coil current $I_c$ to be substantially linear at a rate low enough to prevent jerkiness and chatter of the clutch in the region of clutch engagement, but not so low as to cause excessive wear of the clutch plate faces. As shown in FIG. 5, the controller 38 comprises an output transistor 40 for controlling current flow through coil 12; the transistor 40 in turn is controlled by circuitry 42 that monitors coil current to detect the initial current decrease and, in response, biases the transistor to establish the "fallback" level and a substantially linear current ramp-up through the coil 12. A current sensor 44 within the current loop develops an output voltage as a function of the magnitude of coil current $I_c$. The sensor voltage is amplified in 46 and differentiated in a differentiator 48 to measure the rate of decrease of the initial dip of coil current $I_c$.

Figure 4:
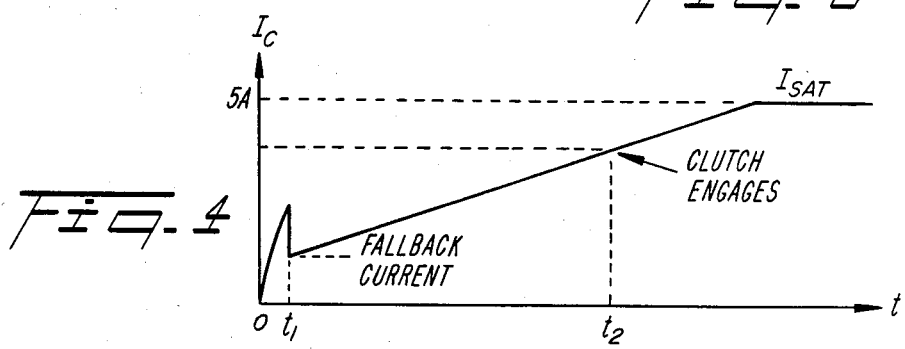
FIG. 4 is a graph showing coil current as a function of time following switch closure, in accordance with the principles of the invention.

The output 50 of differentiator 48 is applied to a comparator 52 that compares the magnitude of current fallback with a predetermined magnitude, and in response, develops a control voltage at 54 to initiate a ramp generator 56. Generator 56, in response, generates a ramp voltage starting from the predetermined "fallback" current value which is applied to the control input or base of transistor 40. The ramp is developed to move the armature at an optimum rate through the region of clutch engagement and has a slope tailored to the particular electromagnetic solenoid or other device to which the transistor is connected, as shown in FIG. 4. The final current flowing through coil 12 and transistor 40 is the saturation current $I_{sat}$ of the coil. Coil current is thereafter terminated by reopening switch 34, readying the clutch solenoid for another cycle.

To prevent the clutch from being "false-started" when switch 34 is initially closed, a reset circuit 58 monitors voltage applied across coil 12 and transistor 40. In response to an initial application of supply voltage to the coil 12 upon closure of switch 34, reset circuit 58 overrides the output of the current ramp generator 56 and maintains transistor 40 off for a predetermined time period. Thereafter, the reset circuit 58 is itself disabled and does not affect transistor 40; transistor 40, following detection of a current fallback, is controlled solely by the output of ramp generator 56.

Figure 6:
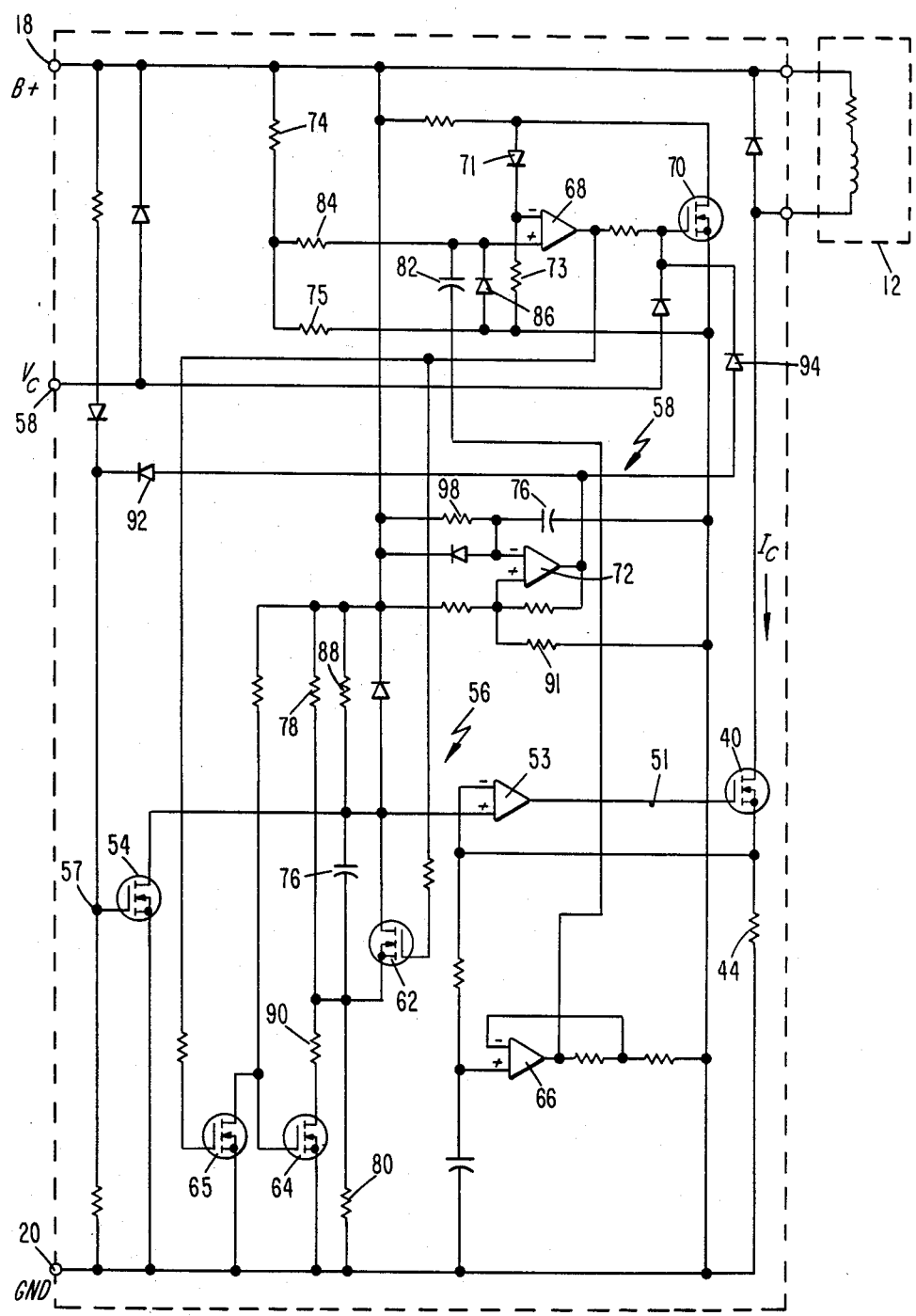
FIG. 6 is a detailed circuit diagram of a preferred embodiment of the controller.

Referring now to FIG. 6, circuitry forming controller 38 is described in detail. Coil 12 is connected between power input terminals 18, 20 and in series with power MOSFET 40. MOSFET 40, which controls the magnitude of current flowing through the coil 12, has a gate 51 controlled by the output of a first operational amplifier 53. Amplifier 53 in turn is controlled by MOSFET 55 having its gate 57 connected to a control input terminal 59 and is also controlled by the ramp generator 56 that includes MOSFEts 62 and 64. Coil current $I_c$ measured by sensor resistor 44 is applied to the differentiator 48 comprising operational amplifiers 66 and 68 and associated circuitry as well as MOSFET 70. The power-on reset circuit 58 is comprised of operational amplifier 72 and its associated circuitry.

In operation, assume that power is applied to input terminals 18 and 20, and that control terminal 59 is held initially high to maintain power output MOSFET 40 off and coil 12 de-energized. MOSFET 55, with its gate 57 high, is initially turned on, grounding the non-inverting input of operational amplifier 53, configured as a follower. With the inverting input of operational amplifier 53 also initially low since there is no voltage drop across current sensor 44, the output of the amplifier 53 is low, maintaining power MOSFET 40 off.

MOSFET 70 has a drain that is connected, through a diode 71, to the inverting input of amplifier 68. With the MOSFET 70 initially turned on by control input 58, the inverting input of amplifier 68 is held low by resistor 73. The non-inverting input of amplifier 68 is biased by resistors 74 and 75 to a small positive value. The output of the amplifier 68 is thus high, maintaining the gate of MOSFET 65 high and the MOSFET 64 off. MOSFET 62 of ramp generator 56 is initially turned on by the output of amplifier 68, short circuiting timing capacitor 76 and thus disabling the ramp generator.

To energize clutch coil 12, control input 59 is grounded by a means (now shown) associated with switch 34. In response, MOSFET 55 is turned off; the non-inverting input of amplifier 52 via MOSFET 62 now is at a positive voltage determined by the values of resistors 78 and 80. Amplifier 53, in response, turns on power MOSFET 40, permitting the current through 12 to rise at a rate determined by the R-L time constant of the coil 12 and source of power.

Coil current $I_c$ measured across resistor 44 is amplified by amplifier 66 configured as a follower with gain. Current dip as the armature gap closes is detected by differentiator circuitry comprising capacitor 82 and resistor 84, clamped by diode 86. The signal thus developed is applied to the non-inverting input of amplifier 68.

In response, the output of amplifier 68 drops, biasing MOSFET 70 off which in turn enables the inverting input of amplifier 68 to rise. This drives the output of amplifier 68 to ground, turning MOSFET 62 off. With MOSFET 62 off, capacitor 76 now charges through resistor 88 to develop a ramp.

The output of operational amplifier 68 also turns MOSFET 65 off which in turn biases MOSFET 64 on, grounding one side of resistor 90. The low side of capacitor 76 is thus now held at a voltage established by resistors 78 and 90. This voltage corresponds to the desired value of the "fallback" current.

The non-inverting input of amplifier 53 begins to ramp-up from a voltage equivalent to the desired fallback current measured by resistor 44. The time constant of resistor 88 and capacitor 76 is quite large to cause the ramp to be substantially linear as the coil current $I_c$ ramps up from the fallback current level to the level of saturation. In practice, fallback current is approximately 0.9 amp and saturation current is approximately 5 amps; the time constant of resistor 88 and capacitor 76 is on the order of 84 seconds, and only several seconds is required for the coil current to pass through the transition from between 0.9 amps and 5 amps, within the substantially linear portion of the exponential curve. Coil current is thereafter maintained at its saturation value until the coil 12 is thereafter de-energized by applying a high voltage to control terminal 59.

Power-on reset circuit 58 maintains power MOSFET 40 off for a predetermined time following application of initial power to input terminals 18 and 20. The non-inverting input of amplifier 72 is connected to the positive power line 18 and the non-inverting input is connected, through resistor 91 to the negative power input (ground) 20. Upon initial application of power to lines 18 and 20, the output of amplifier 72 is initially high, biasing MOSFET 55 through diode 92 on and also biasing MOSFET 70 through diode 94 on. With MOSFETs 55 and 70 initially maintained on by amplifier 72, power MOSFET 40 is maintained off.

As capacitor 96 now begins charging through resistor 98, the output of amplifier 72, following a predetermined time period, becomes low, and therefore isolated from the gates of MOSFETs 55 and 70 via diodes 92 and 96. With MOSFETs 55 and 70 isolated from and therefore independent of amplifer 72, power MOSFET 40 is controlled by the remaining circuitry constituting the controller 38 in the manner described above.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

For example, although analog circuitry has been shown as constituting the controller 38 in the preferred embodiment, it is apparent that the controller may alternatively be provided by a programmed microprocessor. It is furthermore understood that analog circuitry within controller 38 other than that described above may be provided. Furthermore, although the circuitry described herein is applied to control an electromagnetic clutch, other electromagnetic devices can be controlled thereby.

I claim:

1. A circuit for supplying driving current to the coil of an electromagnetic device having a movable armature comprising:
    means for applying a voltage across said coil to cause a first current to flow therethrough;
    means for measuring a change in said first current in response to a change in an electromagnetic characteristic of said device; and
    means responsive to said change for applying through said coil and second initially decreasing and then increasing current.

2. The circuit of claim 1, wherein said characteristic is coil inductance.

3. The circuit of claim 2, wherein coil current is measured as a function of coil inductance.

4. The circuit of claim 3, wherein said measuring means includes means for detecting a predetermined decrease in coil current magnitude caused by armature movement.

5. The circuit of claim 4, wherein said device is an electromagnetic clutch.

6. The circuit of claim 5, wherein said second current is increased in a linear fashion.

7. The circuit of claim 1, including reset means for maintaining said coil de-energized for a predetermined time period following an initial application of power to said circuit.

8. A circuit for supplying driving current to the coil of an electromagnetic device having a movable armature, comprising:
    means for applying a voltage across said coil to cause a first current to flow therethrough;
    means for measuring said first current;
    means responsive to said measuring means for detecting a current dip indicative of initial armature movement; and
    means responsive to said current dip for applying to said coil a second current having a magnitude that first decreases and then increases substantially linearly to cause controlled further movement of said armature.

9. The circuit of claim 8, wherein said detecting means includes means for measuring a rate of change of said first current.

10. The circuit of claim 8, including reset means for maintaining said coil de-energized for a predetermined time period following initial power application to said circuit.

11. A method of energizing the coil of an electromagnetic device having a movable armature, comprising the steps of:
    applying a voltage across said coil to cause a first current to flow therethrough;
    detecting an initial movement of said armature, and, in response;
    causing the coil current to decrease to a preset value and then applying to said coil a second, substantially linearly increasing current to cause controlled further movement of said armature.

12. The method of claim 11, wherein said detecting step includes measuring coil current to detect a current dip indicative of initial movement of said armature.

13. The method of claim 12, wherein the step of measuring includes measuring a rate of change of current.

14. The method of claim 12, including an additional step of detecting a start-up voltage and, in response, inhibiting application of said voltage to said coil for a predetermined time period thereafter.

* * * * *